Figure 1:
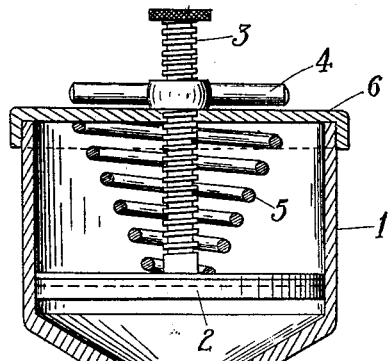

J. H. SYMONDS.
LUBRICATOR.
APPLICATION FILED JAN. 13, 1916.

1,197,683.

Patented Sept. 12, 1916.

INVENTOR
JOSEPH H. SYMONDS
By
ATTORNEY

UNITED STATES PATENT OFFICE.

JOSEPH H. SYMONDS, OF CHARLESTOWN, MASSACHUSETTS.

LUBRICATOR.

1,197,683.  Specification of Letters Patent.  Patented Sept. 12, 1916.

Application filed January 13, 1916. Serial No. 71,969.

*To all whom it may concern:*

Be it known that I, JOSEPH H. SYMONDS, a citizen of the United States, residing at Charlestown, county of Suffolk, Commonwealth of Massachusetts, have invented certain new and useful Improvements in Lubricators, of which the following is a specification.

This invention relates to lubricators, and particularly to a device for lubricating the guide rails of an elevator.

The automatic application of a lubricant to the guide of an elevator by means of devices carried by the elevator itself is complicated by the difficulty of maintaining proper contact of the distributing element of the lubricator with the guides in all the swaying motions of the elevator while in operation.

My present invention contemplates a construction wherein this contact is effectively maintained under all the motions of the car in travel. This is effected by means of a mount for the lubricant distributer and container having a sliding movement relative to the distributer, and a swivel movement relative to the elevator. The distributer consists of a longitudinal stem having a distributing head. The stem is connected with a fitting into which the lubricator container is threaded. Slidable on this stem between the distributing head and the fitting is a sleeve having a swivel connection with a bracket carried by the elevator. The swaying movements of the elevator are imparted to the sleeve by the bracket and the sleeve thereby caused to slide relatively to the distributing head, compressing a spring interposed between the sleeve and head and thereby maintaining the head in proper surface contact with the elevator guide. The swivel connection of the sleeve with the bracket prevents the distributer and container turning, should the elevator swerve. The lubricator container itself has sliding bearing upon the bracket to which the sleeve is swiveled.

The construction and operation of my invention will be more fully disclosed in the specification which follows. In the drawings accompanying that specification I have shown two embodiments which well illustrate the principles of my invention, and are in themselves forms found satisfactory in use and well adapted to the requirements of manufacture.

Figure 3:
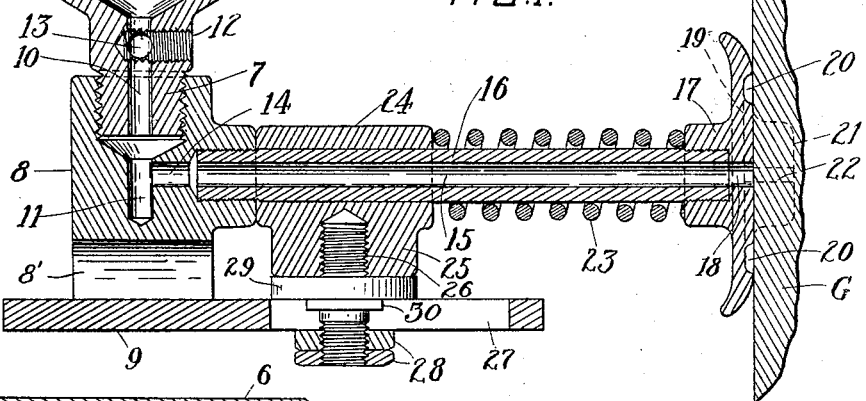
Figure 3:
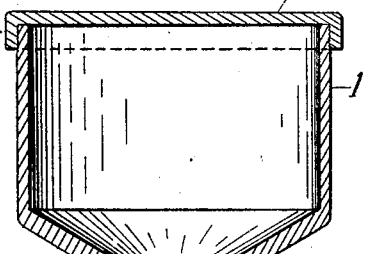
Figure 2:
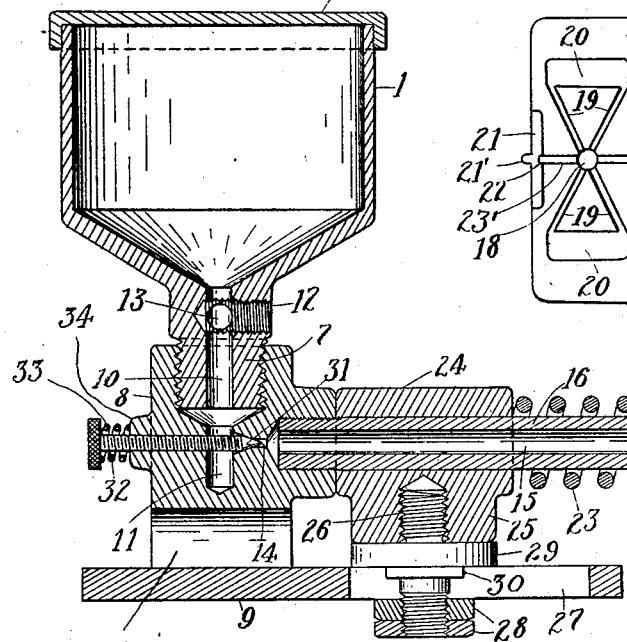

Throughout specification and drawings, like reference characters are correspondingly applied, and in these drawings, Figures 1 and 2 are vertical sections through lubricators in accordance with my invention, and illustrating respectively adaptations for use with both semi-solid and fluid lubricants, and Fig. 3 is an end view of one of the distributers of Fig. 1.

In the form of my invention shown in Fig. 1 the device is designed for use with a semi-solid lubricant such as heavy-bodied grease or graphite. I have indicated at 1 a grease cup which may be of any desired type, and is preferably of the type shown in the drawings, wherein the grease is positively expelled from the cup by a spring-backed plunger 2 mounted on a threaded stem 3 operated by a suitable turn key 4. The spring for the plunger is indicated at 5 and is confined between the plunger and the screw cap 6 of the cup.

The cup 1 has a shouldered nipple 7 threaded externally to screw into a suitable fitting 8 having its under face formed to provide spaced arms $8^1$ adapted for sliding bearing on a bracket 9 secured to the car in any convenient manner. The nipple 7 has an axial bore 10 communicating with the cup, and the fitting 8 has a flared bore 11 alined with the bore 10 and connecting therewith to provide a continuous passage for the lubricant. The passage of grease through the bore 10 is controlled by a suitable cut-off which may conveniently be a screw 12 set laterally through the nipple 7 and provided with an opening 13 adapted to be registered with the bore 10.

The fitting 8 is counterbored at 14 to provide a passage for the grease from the bore 11 to the bore 15 of a stem 16 threaded into said fitting from one side. The stem 16 has a grease distributing device 17 threaded onto its other end. The distributer 17 has an opening 18 and is provided with diagonal grooves 19 (see Fig. 3) intersecting each other at said opening 18 and terminating at their ends in transversely disposed lubricant pockets or recesses 20 which apply the lubricant directly against the face of the elevator guide G. The distributer is provided with lateral flanges 21 whereby to closely embrace the sides of the guide. These flanges are preferably externally ribbed as indicated at 21[1] and are grooved vertically as indicated at 22 and communicate with the distributing opening 18 by transverse grooves 23'. This form of distributer therefore secures uniform application of the lubricant to the face and sides of the guide.

The distributer 17 and container are mounted on the elevator by means of a sleeve 24 caried by the bracket 9. The sleeve 24 is slidable on the stem 16 between the fitting 8 and a coil spring 23 interposed between said sleeve and the head 17. The sleeve has a depending nipple 25 into which a stud 26 is threaded. The stud 26 fits in a longitudinal slot 27 formed in the bracket 9 and is held fast therein by one or more lock nuts 28. The slot 27 is elongated in order to permit adjustment of the sleeve 24 therein and this adjustment is held by the lock nuts 28. The stud 26 therefore provides a swivel connection between the sleeve 24 and the bracket 9. This stud between its ends has a washer 29 bearing against the under face of the nipple 25 and the top face of the bracket 9 on each side of the slot 27. The washer 29 has a squared shoulder 30 which is received in the slot 27 and is designed to prevent turning movement of the stud in the slot.

In the operation of my lubricator, the swaying movements of the elevator are transmitted by the bracket 9 to the sleeve 24 which is forced toward the head 17, compressing the spring 23 and thereby taking up the movement of the elevator. This maintains the head 17 in proper contact with the guide. The fitting 8 slides on the bracket 9 in one direction of lateral movement of the elevator. Should the elevator swerve, the sleeve is simply turned on the stud 26 thereby preventing the distributer and lubricant container from tending to turn.

In the form of my invention shown in Fig. 2, the device is adapted for use with a fluid lubricant. The plunger and associated parts of the grease cup of Fig. 1 are therefore omitted and the oil simply feeds by gravity. In addition to the cut-off 12, the flow is further controlled by a needle valve 31 axially mounted in the counter-bore 14, and operated by a suitable threaded stem 32, the passage 14 being conical at one end to provide a proper seat for the needle valve. In this embodiment of my invention the construction and operation of the parts are otherwise the same, except that the contacting face of the distributer is not grooved as in the case of the distributer shown in Figs. 1 and 3, merely having the two spaced lubricant pockets 20, the fluid character of the lubricant used in the embodiment of itself insuring proper distribution to the guide. The adjustment of the needle valve 31 is held by a coil spring 33 confined between the head of the valve stem and a boss 34 on the fitting 8.

Various other modifications in the form and construction of my device may obviously be resorted to without departing from the spirit of my invention if within the limits of the appended claims.

What I therefore claim and desire to secure by Letters Patent is:

1. In an elevator guide lubricator, a lubricant distributer in communication with a source of lubricant, and a swiveled mount for said distributer carried by the elevator.

2. In an elevator guide lubricator, a lubricant distributer in communication with a source of lubricant, and a combined swiveled and sliding mount for said distributer carried by the elevator.

3. In an elevator guide lubricator, a lubricant container, a lubricant distributer in communication therewith, and a mount for said distributer and container carried by the elevator and having spring resisted travel relative to the distributer.

4. In an elevator guide lubricator, a lubricant container, a lubricant distributer in communication therewith, a bracket carried by the elevator, and a mount for said distributer and container having a swivel connection with said bracket and having spring resisted travel relative to the distributer.

5. In an elevator guide lubricator, a lubricant container, a lubricant distributer in communication therewith, a slotted member carried by the elevator, a stud non-rotatably held in the slot of said member, a mount for said container and distributer swiveled on said stud and slidable relative to said distributer and a spring between said mount and distributer.

6. In an elevator guide lubricator, a lubricant container, a distributer, a conduit member connecting said container and distributer, a sleeve slidable on said conduit member, a spring resisting the sliding movement of said sleeve, a stud swiveled to said sleeve, and a bracket on the elevator carrying said stud.

7. In an elevator guide lubricator, a slotted bracket carried by the elevator, a lubricant container, a distributer, a conduit member connecting said container and distributer, a sleeve slidable on said conduit member, a spring interposed between said sleeve and distributer, and a stud carrying said sleeve and having a shouldered portion disposed in the slot of said bracket to prevent the stud turning in the slot.

8. In an elevator guide lubricator, a slotted member carried by the elevator, a lubricant container, a coupling having sliding bearing on said slotted member and having communication with the feed passage of said container, a conduit member engaged with said coupling, a distributing member communicating with the conduit member, a sleeve slidable on said conduit member and disposed to abut said coupling, a spring interposed between said sleeve and distributer, and a stud engaging said sleeve and having a shouldered portion disposed in the slot of said slotted member to prevent the stud turning in the slot.

9. A lubricant distributer for a device of the class described, consisting of a member having a perforation therein and having a groove extending from said perforation and terminating in a lubricant pocket, said member having another groove extending from said perforation, and a flange on said member having a groove therein communicating with said last named groove of the distributing member.

10. A lubricant distributer for a device of the class described, consisting of a member having a perforation therein and having diagonal grooves intersecting said opening and terminating near each end of the member in transversely disposed lubricant pockets, said member having grooves extending transversely from said perforation to the lateral edges of the member, and flanges on said edges having vertical grooves communicating with said transverse grooves.

11. In an elevator guide lubricator, a lubricant container, a lubricant distributer in communication therewith, and a member slidingly interposed between said container and distributer and swiveled to the elevator.

12. In an elevator guide lubricator, a lubricant container, a lubricant distributer in communication therewith, and a mount for said container and distributer and slidingly interposed therebetween and swiveled to the elevator.

13. In an elevator guide lubricator, a bracket carried by the elevator, a lubricant container, a distributer in communication therewith and a member swiveled to said bracket and slidingly interposed between said container and distributer and having spring resisted travel relative to said distributer.

14. In an elevator guide lubricator, a bracket carried by the elevator, a lubricant container, a fitting therefor disposed for sliding travel on said bracket, a distributer communicating with said fitting, and a mount for said parts carried by said bracket and slidingly interposed between said fitting and distributer.

15. In an elevator guide lubricator, a bracket carried by the elevator, a lubricant container, a fitting therefor disposed for sliding travel on said bracket, a distributer communicating with said fitting, and a mount for said parts swiveled to said bracket and slidingly interposed between said fitting and distributer.

16. In an elevator guide lubricator, a bracket carried by the elevator, a lubricant container having sliding bearing on said bracket, a lubricant distributer disposed for contact with the elevator guide, a hollow stem connecting said distributer and container, a mount for said parts swiveled to said bracket and slidable on said stem between said container and distributer, and a spring opposing the travel of said mount in one direction.

17. In an elevator guide lubricator, a bracket carried by the elevator, a lubricant container, a fitting carrying said container and having sliding bearing on said bracket, a lubricant distributer disposed for contact with the elevator guide, a hollow stem connecting said distributer and fitting, a mount for said parts swiveled to said bracket and slidable on said stem between said fitting and distributer, and a spring interposed between said mount and distributer.

18. In an elevator guide lubricator, a distributer, a fitting receiving said distributer, a lubricant container carried by said fitting, and a mount for said parts carried by the elevator and having sliding travel relative to said distributer.

In testimony whereof I affix my signature in presence of two witnesses.

JOSEPH H. SYMONDS.

Witnesses:
  VICTORIA LOWDEN,
  GEO. B. RAWLINGS.

Copies of this patent may be obtained for five cents each, by addressing the "Commissioner of Patents, Washington, D. C."